US008892342B2

(12) United States Patent
Yamada et al.

(10) Patent No.: US 8,892,342 B2
(45) Date of Patent: Nov. 18, 2014

(54) DRIVING SUPPORT APPARATUS

(75) Inventors: Yuki Yamada, Susono (JP); Hiroshi Onuma, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 651 days.

(21) Appl. No.: 12/999,878

(22) PCT Filed: Dec. 26, 2008

(86) PCT No.: PCT/JP2008/073746
§ 371 (c)(1),
(2), (4) Date: Dec. 17, 2010

(87) PCT Pub. No.: WO2009/157108
PCT Pub. Date: Dec. 30, 2009

(65) Prior Publication Data
US 2011/0093178 A1    Apr. 21, 2011

(51) Int. Cl.
*G08G 1/0962* (2006.01)
*G08G 1/095* (2006.01)
*G08G 1/096* (2006.01)
*G08G 1/0967* (2006.01)

(52) U.S. Cl.
CPC .......... *G08G 1/096725* (2013.01); *G08G 1/096* (2013.01); *G08G 1/096758* (2013.01); *G08G 1/096783* (2013.01); *G08G 1/096716* (2013.01)
USPC ......................................... 701/117; 340/929

(58) Field of Classification Search
USPC .............. 701/70, 93, 116, 117, 123; 340/906, 340/907, 929, 901, 905
See application file for complete search history.

(56) References Cited

U.S. PATENT DOCUMENTS 5,150,116 A *  9/1992  West ............................ 340/928
6,268,805 B1 *  7/2001  Simon ......................... 340/907

(Continued)

FOREIGN PATENT DOCUMENTS

DE    10028130 A1 * 12/2001
EP    1209646 A1 *  5/2002

(Continued)

OTHER PUBLICATIONS

International Search Report issued Mar. 31, 2009 in PCT/JP08/073746 filed Dec. 26, 2008.
International Preliminary Report on Patentability and Wrriten Opinion issued Feb. 17, 2011, in International Application No. PCT/JP2008/073746 (English translation only).

*Primary Examiner* — Thomas G Black
*Assistant Examiner* — Ce Li
(74) *Attorney, Agent, or Firm* — Oblon, Spivak, McClelland, Maier & Neustadt, L.L.P.

(57) ABSTRACT

A driving support apparatus which performs driving support regarding a traffic signal includes: a communication device which acquires time-series traffic signal information regarding the lighting state of the traffic signal; a time calculating unit which calculates the time remaining until the lighting state changes on the basis of the traffic signal information; and an output device which notifies a driver of lighting time information regarding the time remaining. When the time remaining is equal to or smaller than a threshold value, the output device does not perform notification of the lighting time information so that it can be difficult for the driver to predict the timing at which a red lighting state of the traffic signal will change. Accordingly, it becomes possible to suppress unsafe action by the driver based on the traffic signal information notification received.

13 Claims, 9 Drawing Sheets (A)

(B)

(C)

(56) References Cited

U.S. PATENT DOCUMENTS

| | | | |
|---|---|---|---|
| 6,331,824 B1 * | 12/2001 | Firestone | 340/929 |
| RE40,737 E * | 6/2009 | Firestone | 340/929 |
| 2002/0005790 A1 * | 1/2002 | Georgalis | 340/929 |
| 2003/0137428 A1 * | 7/2003 | Hutchison | 340/815.45 |
| 2006/0009188 A1 | 1/2006 | Kubota et al. | |
| 2006/0092044 A1 * | 5/2006 | Naljotov | 340/907 |
| 2006/0197684 A1 * | 9/2006 | Tremblay | 340/909 |
| 2007/0176791 A1 * | 8/2007 | Bolotin et al. | 340/929 |
| 2007/0257817 A1 * | 11/2007 | Mahoney | 340/929 |
| 2008/0253615 A1 | 10/2008 | Kubota et al. | |
| 2009/0076698 A1 * | 3/2009 | Yokoyama et al. | 701/70 |

FOREIGN PATENT DOCUMENTS

| | | |
|---|---|---|
| JP | 7 294275 | 11/1995 |
| JP | 2004 171459 | 6/2004 |
| JP | 2005 227987 | 8/2005 |
| JP | 2005 247265 | 9/2005 |
| JP | 2006 48624 | 2/2006 |
| JP | 2008 112255 | 5/2008 |

* cited by examiner

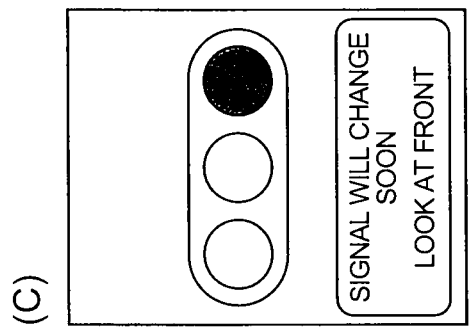
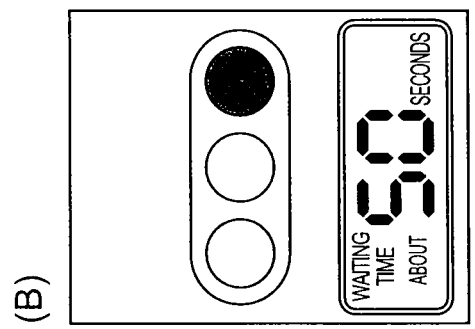
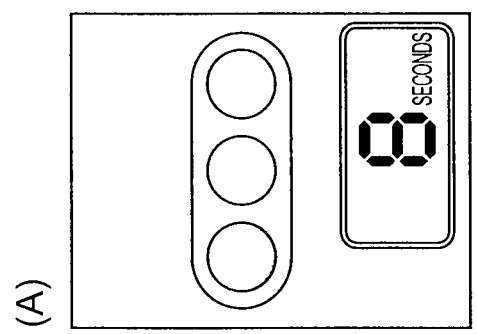
Fig.5

Fig.6
(A)
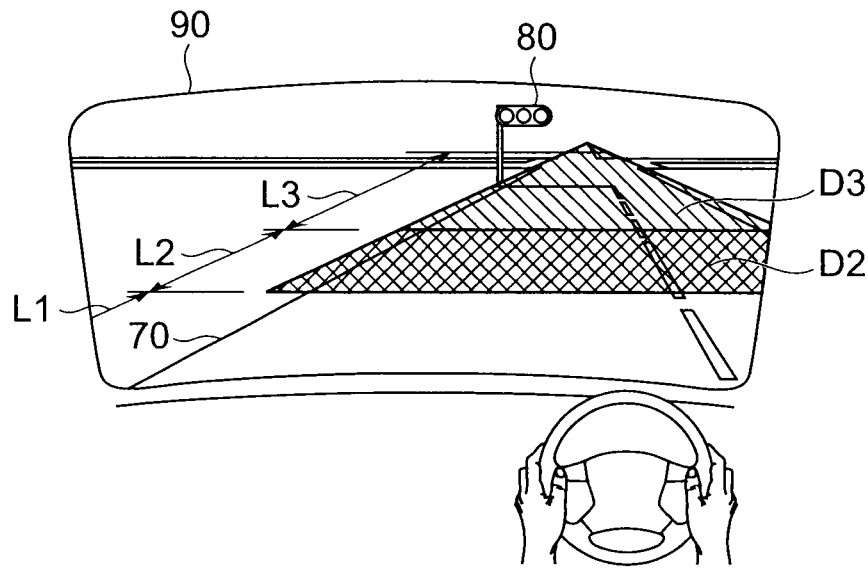
(B)
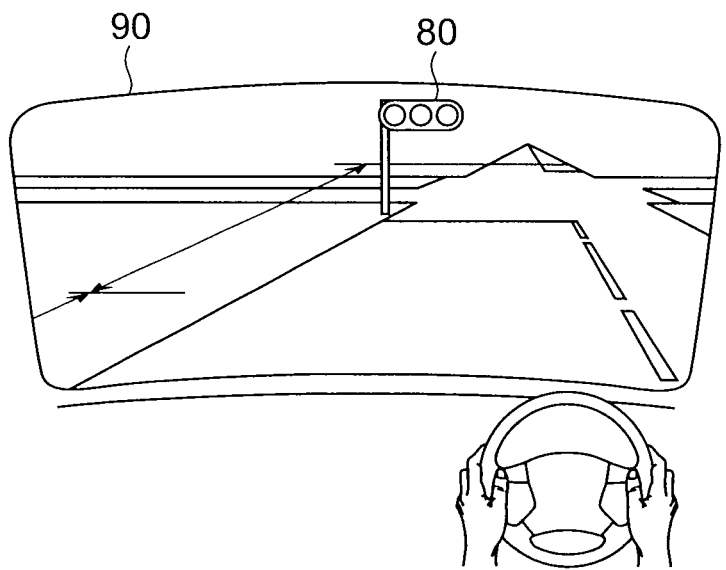

DRIVING SUPPORT APPARATUS

TECHNICAL FIELD

The present invention relates to a driving support apparatus which supports driving.

BACKGROUND ART

As a driving support apparatus which performs driving support for a driver in the related art, an apparatus which notifies a lighting state of a traffic signal and a time until the lighting state changes is known (for example, refer to Patent Document 1). The apparatus disclosed in Patent Document 1 receives the traffic signal information regarding the lighting state and the lighting time of a traffic signal and sends a notification of a time until the lighting state of the traffic signal changes through a speaker on the basis of the received traffic signal information. By sending notification of the time until the lighting state of the traffic signal changes, mentally calm driving can be urged.

Patent Document 1: Japanese Unexamined Patent Application Publication No. 2004-171459

SUMMARY OF INVENTION

Technical Problem

In the known driving support apparatus, however, the driver recognizes a timing at which the lighting state changes because the time until the lighting state of the traffic signal changes is notified. For this reason, for example, if a driver recognizes the end timing of green lighting while traveling toward an intersection, the driver may perform sudden acceleration in order to meet the end timing of green lighting. Moreover, for example, if the driver recognizes an end timing of red lighting in a signal waiting state, the driver may perform sudden acceleration in accordance with the end timing of red lighting in order to be able to move simultaneously with the start of green lighting.

Therefore, the present invention has been made to solve such technical problems, and it is an object of the present invention to provide a driving support apparatus capable of suppressing unsafe action by the driver based on the traffic signal information received.

Solution to Problem

That is, a driving support apparatus related to the present invention is a driving support apparatus which performs driving support regarding a traffic signal and includes: an acquisition unit which acquires time-series traffic signal information regarding the lighting state of the traffic signal; and a first notification unit which notifies a driver of lighting time information regarding the time remaining until the lighting state changes. The first notification unit is characterized in that notification of the lighting time information is not performed when the time remaining is equal to or smaller than a predetermined value.

According to this invention, the traffic signal information is acquired, and the driver can be notified of the lighting time information when the time remaining until the lighting state changes is larger than the predetermined value and the driver cannot be notified of the lighting time information when the time remaining is equal to or smaller than the predetermined value. In this case, since it is possible to make it difficult to predict the timing, at which the lighting state of the traffic signal changes, while the lighting state of the traffic signal is changing, it becomes possible to suppress predictive driving according to the timing at which the lighting state of the traffic signal changes. Therefore, unsafe actions by the driver based on the traffic signal information received can be suppressed.

In addition, a driving support apparatus related to the present invention is a driving support apparatus which performs driving support regarding a traffic signal and includes: an acquisition unit which acquires time-series traffic signal information regarding a lighting state of the traffic signal; a calculation unit which calculates the time remaining until the lighting state changes on the basis of the traffic signal information; and a first notification unit which notifies a driver of lighting time information regarding the time remaining. The first notification unit is characterized in that notification of the lighting time information is not performed when the time remaining is equal to or smaller than a predetermined value.

According to this invention, the traffic signal information is acquired and the remaining time until the lighting state changes is calculated. Then, the lighting time information can be notified to the driver when the time remaining is larger than the predetermined value, and the lighting time information cannot be notified to the driver when the time remaining is equal to or smaller than the predetermined value. In this case, since it is possible to make it difficult to predict the timing, at which the lighting state of the traffic signal changes, while the lighting state of the traffic signal is changing, it becomes possible to suppress predictive driving according to the timing at which the lighting state of the traffic signal changes. Therefore, unsafe actions by the driver based on the traffic signal information received can be suppressed.

Here, it is preferable to include a second notification unit which notifies the driver of general lighting time information, in which a change time of the lighting state is unclearly expressed compared with the lighting time information, when the time remaining is equal to or smaller than a predetermined value. By adopting such a configuration, it is possible to make it difficult to predict the timing, at which the lighting state of the traffic signal changes, while continuously providing the information to the driver. Accordingly, it is possible to avoid a situation where the driver feels a sense of unease due to abrupt stopping of driving support.

In addition, it is preferable to include a third notification unit which notifies the driver of guide information, which urges signal watching, when the time remaining is equal to or smaller than a predetermined value. By adopting such a configuration, it is possible to perform a vehicle operation on the basis of an actual traffic signal. Accordingly, it becomes possible to suppress unsafe action by the driver based on prediction.

In addition, it is preferable to include a vehicle control unit which invalidates an accelerator operation by the driver when the time remaining is equal to or smaller than a predetermined value. By adopting such a configuration, the accelerator operation can be invalidated even if the driver performs accelerator operation on the basis of prediction. Accordingly, it becomes possible to reliably prevent an unsafe situation caused by the driver's operation.

In addition, it is preferable that the first notification unit sets the end timing of notification of the lighting time information to be different from an update timing of the lighting time information when updating and sending notification of the lighting time information at predetermined intervals. By adopting such a configuration, it is possible to reduce the difference between the content of support and the driver's feeling. Accordingly, unsafe action by the driver based on the traffic signal information received can be suppressed while reducing a sense of unease of the driver.

Moreover, it is preferable that the first notification unit continues the notification of the lighting time information when the time from the start timing of notification of the lighting time information to the end timing of notification of the lighting time information falls within a predetermined time. By adopting such a configuration, a screen change within a short time can be avoided. Accordingly, it becomes possible to perform driving support which is easy for the driver to understand.

Advantageous Effects of Invention

According to the present invention, it is possible to suppress unsafe action by the driver based on the traffic signal information received.

BRIEF DESCRIPTION OF DRAWINGS

FIG. 5 is a screen figure showing an example of support by driving support apparatuses related to the first and second embodiments.

FIG. 6 is an explanatory view showing an example of support by the driving support apparatus related to the first embodiment.

REFERENCE SIGNS LIST

Figure 1:
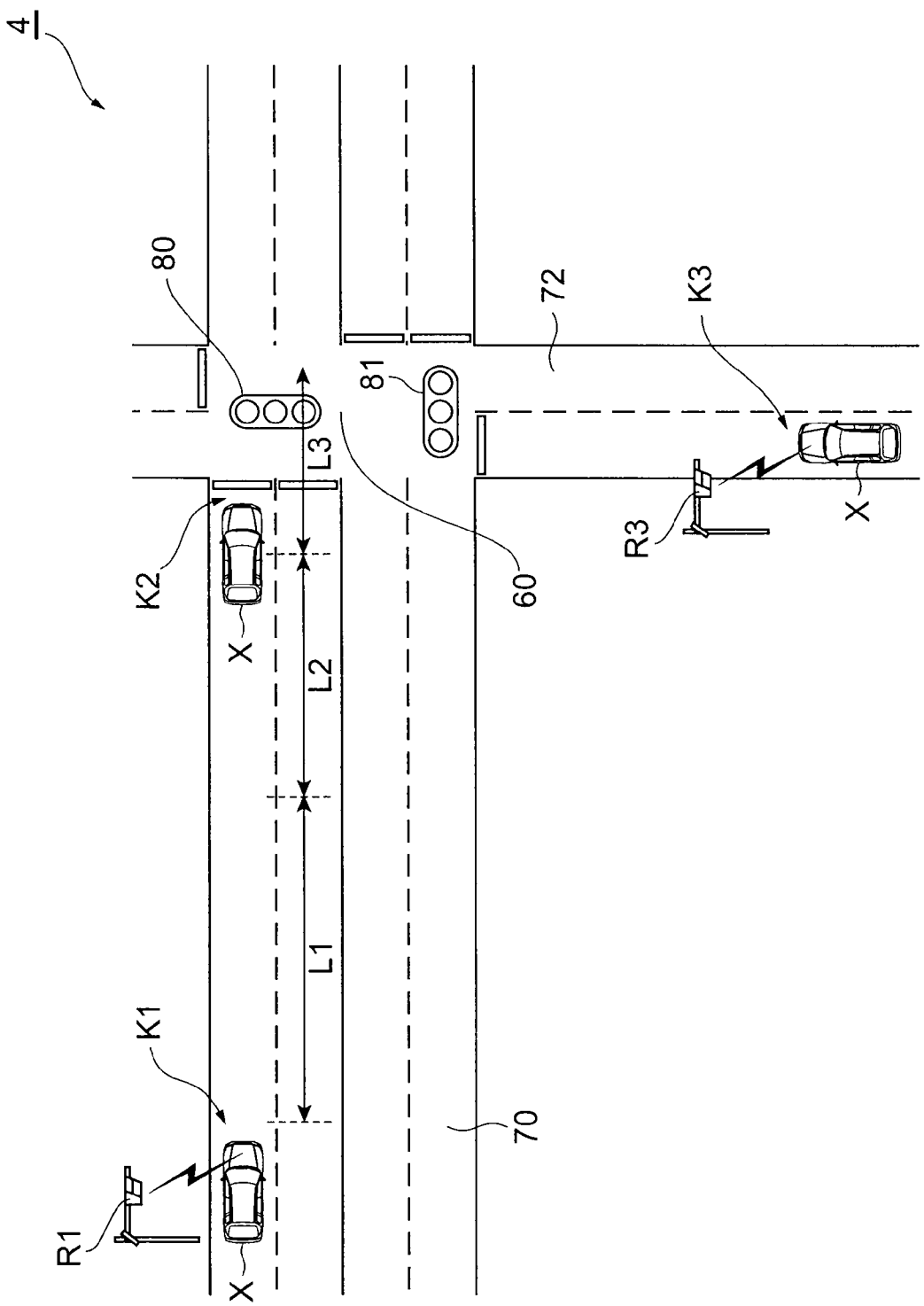
FIG. 1 is a schematic view showing the configuration of a driving support system including a driving support apparatus related to a first embodiment.

1: driving support apparatus
10: ECU
12: time calculating unit (calculation unit)
13: driving support unit
20: communication device (acquisition unit)
21: vehicle speed sensor
30: output device (first to third notification units)
Rn: roadside support apparatus
X: vehicle

DESCRIPTION OF EMBODIMENTS

Hereinafter, embodiments of the present invention will be described with reference to the accompanying drawings. Moreover, in each drawing, the same or corresponding sections are denoted by the same reference numerals and a detailed explanation thereof will be omitted.

(First Embodiment)

A driving support apparatus related to the present embodiment is a driving support apparatus which performs driving support for a driver and is appropriately adopted in a driving support system which acquires traffic signal information through road-to-vehicle communication, for example. First, the outline of a driving support system including the driving support apparatus related to the present embodiment will be described. FIG. 1 is a schematic view of the driving support system including the driving support apparatus related to the present embodiment. Moreover, in FIG. 1, a road where a main road 70 and a secondary road 72 cross each other is shown as an example. In addition, a traffic signal of the main road 70 is shown as a traffic signal 80, and a traffic signal of the secondary road is shown as a traffic signal 81.

As shown in FIG. 1, a driving support system 4 includes a roadside support apparatus Rn (n: integer). The roadside support apparatus Rn is disposed on the road, at the roadside, or near the road and, for example, a light beacon is used. In addition, it has a function of detecting a vehicle X, which passes in the vicinity of the installation point of the roadside support apparatus Rn, and communicating with the vehicle X. This road-to-vehicle communication is so-called spot communication which is performed only in a predetermined range (service section).

In addition, the roadside support apparatus Rn is configured to be able to receive the traffic signal information of the surrounding traffic signals 80 and 81 from a central management center which performs traffic control, for example. In addition, the roadside support apparatus Rn has a function of providing the traffic signal information to the vehicle X by spot communication. For example, the roadside support apparatus R1 has a function of providing the traffic signal information of the traffic signal 80, which is provided in the traveling direction of the vehicle X, to the vehicle X which travels through a point K1 of the main road 70 that is within the service section. The traffic signal information provided to the vehicle X is time-series information regarding the lighting states of the traffic signals 80 and 81. For example, a lighting state, such as red, green, and yellow, and their respective lighting time, and the like are included.

As the traffic signals 80 and 81 shown in FIG. 1, for example, a control type traffic signal is used. The control type traffic signal is a traffic signal which changes and controls each lighting time of each lighting state. The control type traffic signal has a function of performing control such that the green signal time of the main road and the red signal time of the secondary road are extended when traffic on the main road is heavy. Details of the traffic signal information of the traffic signals 80 and 81 will be mentioned later. Thus, in the driving support system 4, the traffic signal information is provided to the vehicle X through spot communication in the service section of the roadside support apparatus Rn.

Figure 2:
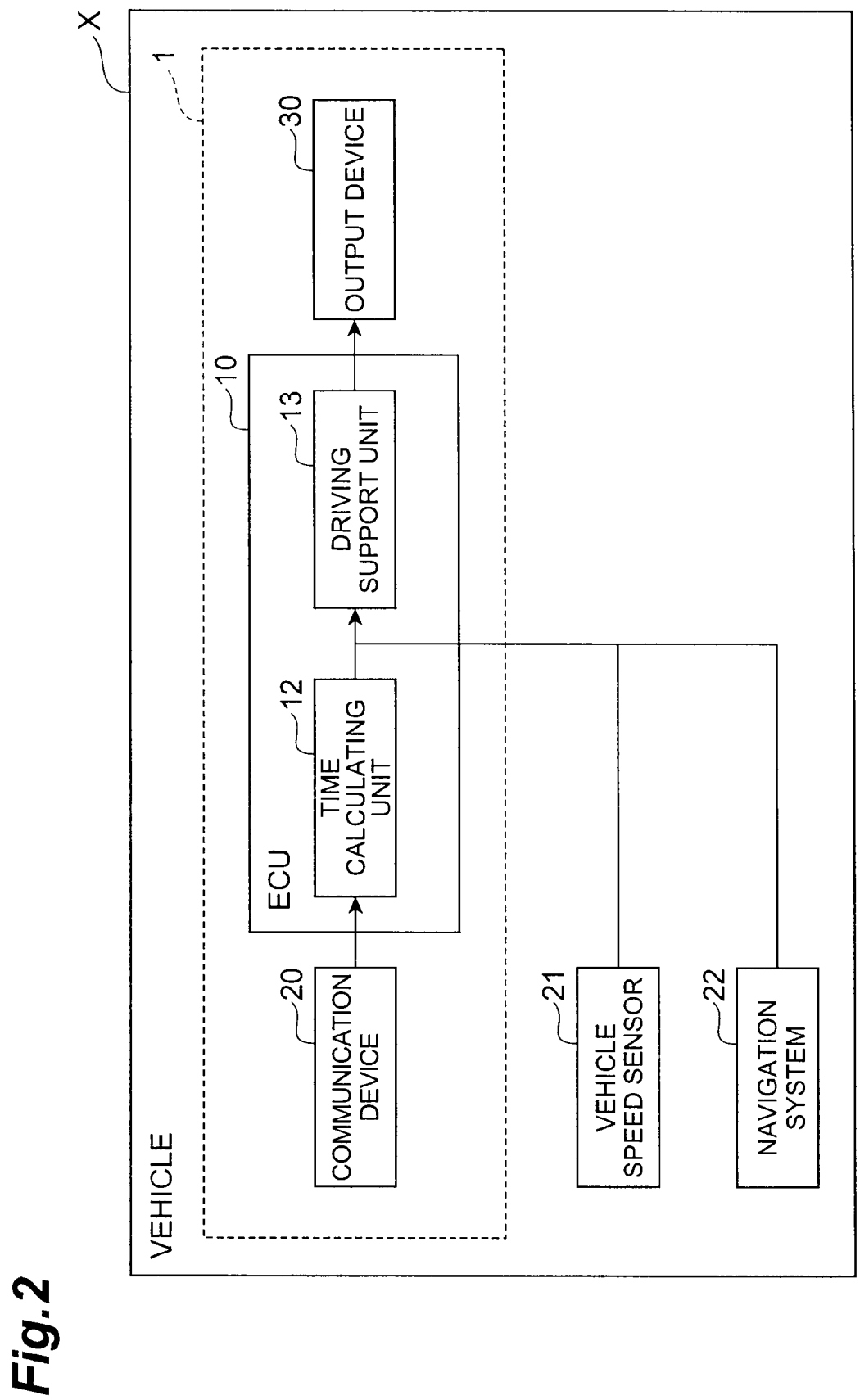
FIG. 2 is a block diagram showing the outline of the configuration of a vehicle including the driving support apparatus related to the first embodiment.

Next, the configuration of the vehicle X including the driving support apparatus related to the present embodiment will be described. FIG. 2 is a block diagram showing the configuration of the vehicle X including a driving support apparatus 1 related to the embodiment of the present invention.

As shown in FIG. 2, the vehicle X includes a communication device (acquisition unit) 20, a vehicle speed sensor 21, a navigation system 22, an ECU (Electronic Control Unit) 10, and an output device (first notification unit) 30. Here, the ECU is a computer of an automobile device which performs electronic control and is configured including a CPU (Central Processing Unit), a ROM (Read Only Memory), a RAM (Random Access Memory), an input/output interface, and the like.

The communication device 20 has a function of communicating with the roadside support apparatus Rn, for example, has a function of receiving the traffic signal information. The communication method between the roadside support apparatus Rn and the communication device 20 is wireless communication using near-infrared light, for example, and the communication device 20 is configured such that bidirectional communication is possible. In addition, the communication device 20 has a function of outputting the information acquired by communication to the ECU 10.

The vehicle speed sensor 21 is a sensor which detects a vehicle speed. For example, the vehicle speed sensor 21 has a function of detecting the rotation of a wheel by detecting a magnetic flux change, which is caused by the rotation of the wheel, and detecting a vehicle speed using a wheel speed pulse. In addition, the vehicle speed sensor 21 has a function of outputting the detected vehicle speed to the ECU 10.

The navigation system 22 has a function of acquiring the map information, the current position of the vehicle X, the traffic information, and the like. Installation points of traffic signals are included in the map information. In addition, the navigation system 22 has a function of outputting the acquired information to the ECU 10.

The ECU 10 includes a time calculating unit (calculation unit) 12 and a driving support unit 13.

The time calculating unit 12 has a function of calculating the time remaining until a predetermined light color changes on the basis of the traffic signal information received by the communication device 20. In addition, the time calculating unit 12 has a function of updating the time remaining using the calculation period of the ECU 10. In addition, the time calculating unit 12 has a function of outputting the calculated time remaining to the driving support unit 13.

The driving support unit 13 has a function of performing driving support by controlling the output device 30 on the basis of the traffic signal information, which has been received by the communication device 20, and the remaining time until a predetermined light color changes, which has been calculated by the time calculating unit 12. For example, the driving support unit 13 has a function of notifying a driver of the lighting time information by controlling the output device 30 so that the driver recognizes the time remaining. The lighting time information is information regarding a remaining time. For example, the lighting time information includes not only the information indicating the remaining time as it is but also the information indicating the remaining time with a bar graph, the information indicating the remaining time as a distance based on the vehicle speed, the information indicating the remaining time as words such as "time enough" and "only a little left", and the like. In addition, the driving support unit 13 has a function of determining a notification method, such as performing notification using only sound information, performing notification using sound information and image information, and performing notification using only image information. In addition, the driving support unit 13 has a function of controlling the output device 30 so that the driver is not notified of the lighting time information when the remaining time becomes equal to or smaller than a predetermined value. In addition, the driving support unit 13 has a function of controlling the output device 30 so that the driver is not notified of the lighting time information when a period from a support start time to a time when the signal lighting state changes is equal to or smaller than a predetermined value. In addition, the driving support unit 13 has a function of outputting to the output device 30 a notification command based on the content of driving support, the information method, and the like which have been determined.

The output device 30 has a function of providing the information to a driver, and has a function of providing the information based on the content of support and the support method determined by the driving support unit 13. For example, a speaker which performs notification using sound information, a display which performs notification using image information, or the like is used as the output device 30. Not only an image and text display device, such as a liquid crystal display or an organic EL display, but also a so-called HUD (Head-Up Display), which projects the road shape onto the windshield and displays it so as to overlap a normal field of view of the driver, is included in the display device. In the case of using the HUD, a region where a lighting color of a traffic signal is given and a road region visible from the normal field of view are displayed so as to overlap each other and notified to the driver. Then, when seen by the driver, the front road is divided by colors into red, green, and yellow. Accordingly, the lighting information of a traffic signal when traveling in a region of the color can be correctly notified. That is, the remaining time until a predetermined lighting color changes is notified as a width (distance information) of a region where a lighting color is given. The lighting time information described above includes that obtained by converting the time remaining into distance information like the case of using the HUD.

The driving support apparatus 1 is formed by the communication device 20, the time calculating unit 12, the driving support unit 13, and the output device 30 described above.

Figure 3:
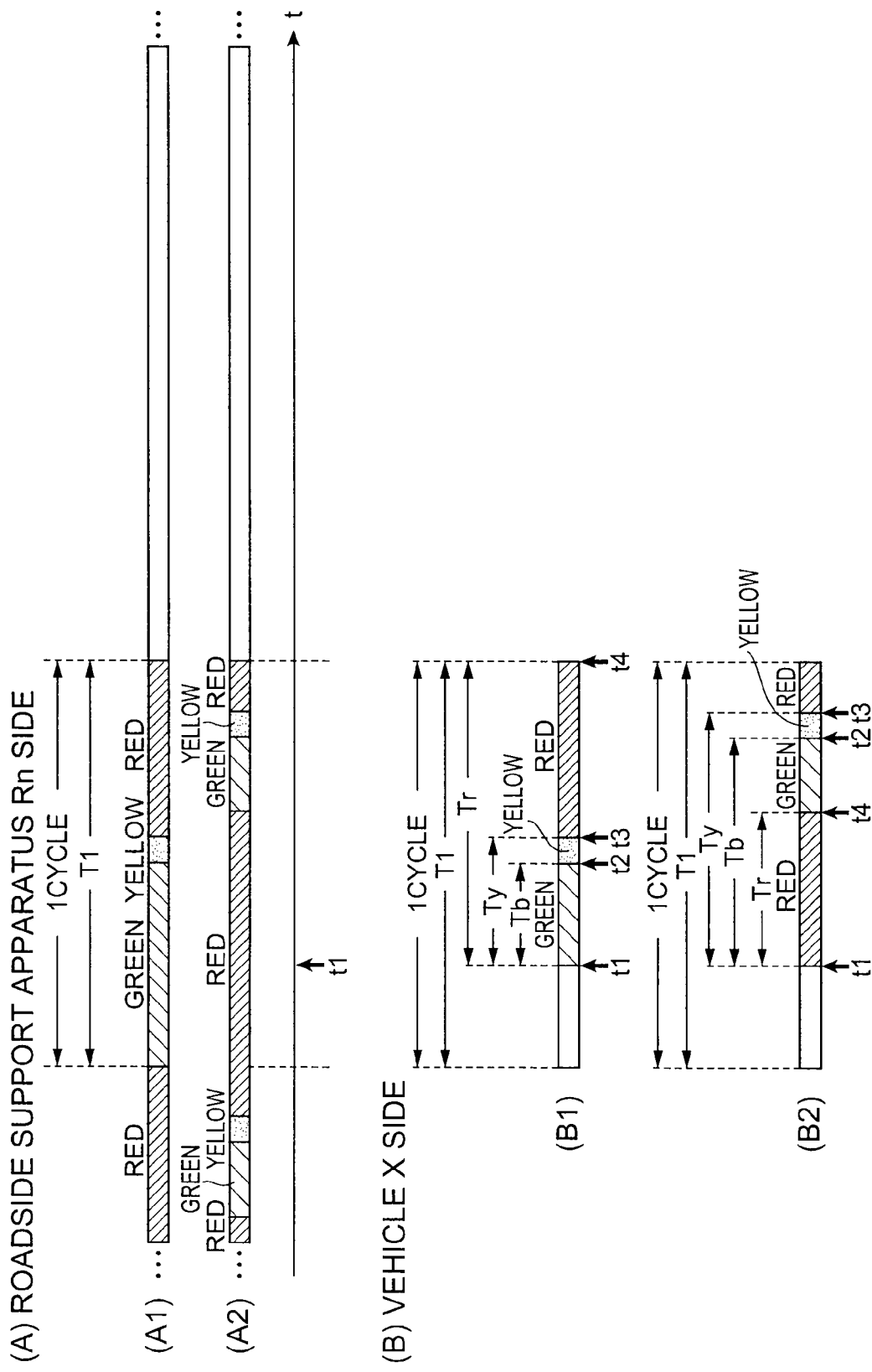
FIG. 3 is the traffic signal information of the driving support system including the driving support apparatus related to the first embodiment.

Next, details of the traffic signal information provided to the vehicle X in the driving support system 4 will be described. FIG. 3 is a schematic view showing a lighting state and a lighting time of a traffic signal in a time-series manner, and shows the traffic signal information of a control type traffic signal. FIG. 3A is the traffic signal information that becomes known to the roadside support apparatus Rn, and FIG. 3B is the traffic signal information that the vehicle X receives. In addition, (A1) in FIG. 3A shows the traffic signal information on the main road, and (A2) in FIG. 3A shows the traffic signal information on the secondary road crossing the main road. The traffic signal information on the main road is information provided when the vehicle X travels on the main road, and the traffic signal information on the secondary road is information provided when the vehicle X travels on the secondary road. Hereinbelow, in the traffic signal information on the main road side, a period from the lighting of green to the extinguishing of red is described as 1 cycle of a traffic signal. That is, it is 1 cycle if a traffic light color on the main road side changes to green, yellow, and red. On the other hand, since the secondary road side is the opposite of the main road side, red, green, yellow, and red are equivalent to 1 cycle on the main road side. In addition, the time at which the traffic signal information is provided from the roadside support apparatus Rn to the vehicle X (time at which the vehicle X receives the traffic signal information) is set to t1.

The control type traffic signal is a traffic signal which changes and controls each lighting time of each lighting state. For example, the control type traffic signal performs control such that a green signal time of the main road and a red signal time of the secondary road are extended when traffic on the main road is heavy. Thus, the control type traffic signal changes the cycle length according to the traffic flow of the road. Accordingly, in the traffic signal information, the cycle T1 including the providing time t1 is in a decided state and the next cycle is in an undecided state, for example, as shown in (A1) in FIG. 3A. In this case, as shown in (B1) in FIG. 3B, the traffic signal information equivalent to 1 cycle of the cycle T1 including the providing time t1 is provided to the vehicle X. Here, the traffic signal information equivalent to 1 cycle is provided to the vehicle X except for the traffic signal information before the providing time t1. Moreover, among control methods of changing the cycle length, a control method which can be used in spot communication is a control method which can decide on the traffic signal information equivalent to at least 1 cycle when providing the information. For example, a multi-stage control method, a central sensitive control method, a status control method, and a movement control method are used. In addition, the relationship between (A2) in FIG. 3A and (B2) in FIG. 3B is the same as the relationship between (A1) in FIG. 3A and (B1) in FIG. 3B on the main road.

Figure 4:
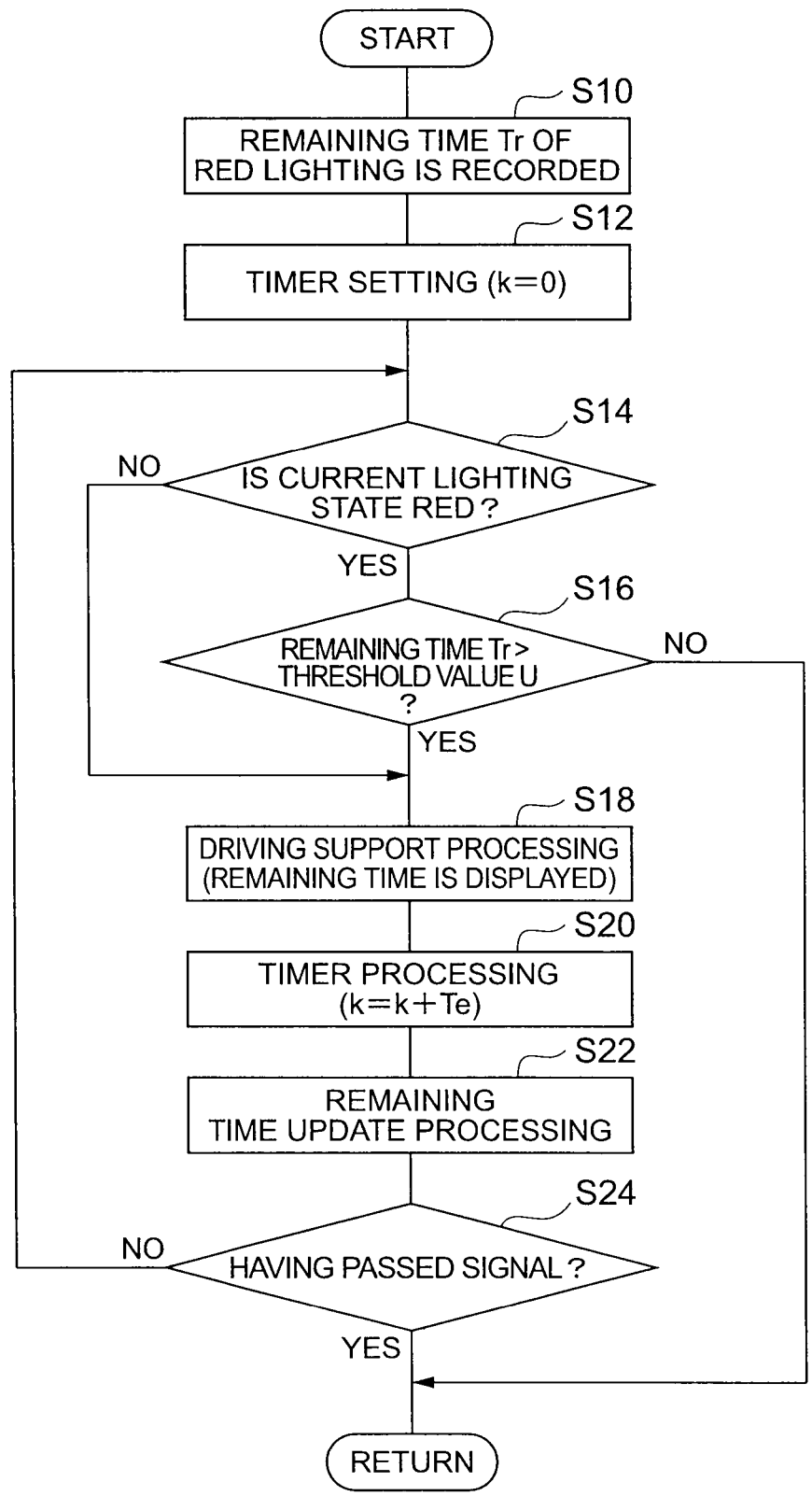
FIG. 4 is a flow chart showing an operation of the driving support apparatus related to the first embodiment.

Next, an operation of the driving support apparatus 1 related to the present embodiment will be described. FIG. 4 is a flow chart showing an operation of the driving support apparatus 1. The control process shown in FIG. 4 is executed at a timing, at which the communication device 20 receives the traffic signal information from the roadside support apparatus Rn, when the vehicle X travels on a side of the roadside support apparatus Rn, for example. Moreover, the case in which predictive driving according to a red lighting end timing is suppressed will be described below in consideration of the ease of understanding of explanations. In addition, a display is assumed to be used as the output device 30. In addition, the case where the vehicle X travels toward the traffic signal 80 on the main road 70 in FIG. 1 will be described as an example.

The control process shown in FIG. 4 starts from processing of calculating the time remaining until a predetermined lighting state changes (S10). The processing of S10 is executed by the time calculating unit 12, and is a process of calculating the time remaining until each lighting color changes on the basis of the traffic signal information received by the communication device 20. For example, assuming that the time calculating unit 12 receives the traffic signal information of (B1) in FIG. 3B at time t1, the time calculating unit 12 specifies a time t2 at which lighting of a green color ends, a time t3 at which lighting of a yellow color ends, and a time t4 at which lighting of a red color ends on the basis of the traffic signal information. Moreover, a time from the providing time t1 to time t2 is set as a remaining time Tb of green lighting, a time from the providing time t1 to time t3 is set as a remaining time Ty of yellow lighting, and a time from the providing time t1 to time t4 is set as a remaining time Tr of red lighting. Each remaining time is stored in a memory provided in the ECU, for example. When the time calculating unit 12 stores each time remaining, the processing of S10 ends and proceeds to initialization processing of a variable for a timer (S12).

The processing of S12 is executed by the driving support unit 13, and is a process of initializing a variable k for a timer. The driving support unit 13 sets the variable k to 0, for example. After the processing of S12 ends, the process proceeds to lighting color determination processing (S14).

The processing of S14 is executed by the driving support unit 13, and is a process of determining whether or not the lighting state when the processing is executed (current lighting state) is red. When it is determined that the current lighting state is not red on the basis of the traffic signal information in the processing time, the driving support unit 13 proceeds to driving support processing (S18). On the other hand, when it is determined that the current lighting state is red, the process proceeds to remaining time Tr checking processing (S16).

The processing of S16 is executed by the driving support unit 13, and is a process of determining whether or not the remaining time Tr is larger than a threshold value. The driving support unit 13 compares the remaining time Tr with a threshold value U set in advance, for example. For example, the threshold value U is set by deriving a value with a size, which is difficult for a driver to count down, by vehicle verification. In addition, a value, which is easily understandable for a driver and which is easily acceptable, is adopted as the threshold value U. For example, if the value derived by vehicle verification is 8 seconds, 10 seconds which is larger than the value and is a multiple of 5 is set as the threshold value U. When the remaining time Tr of red lighting is larger than the threshold value U in the processing of S16, the process proceeds to the driving support processing (S18).

The processing of S18 is executed by the driving support unit 13 and the output device 30, and is a process of actually executing driving support. The driving support unit 13 refers to the remaining time until lighting changes, which is stored in the memory in the processing of S10, according to the current lighting state and displays the remaining time referred to on a display screen. In the case of using a liquid crystal display or the like, for example, the time remaining is displayed in seconds so that the timing at which the current lighting state ends is notified to the driver. FIG. 5A shows an example using a liquid crystal display, and is to notify that the remaining time Tb of a green signal is "8 seconds". Cases of a red signal and a yellow signal can be similar displayed. In addition, when it is determined that current lighting of the traffic signal 80 is a red signal and the vehicle X has stopped at a stop line (point K2) of an intersection 60 by the vehicle speed sensor 21 and the navigation system 22, a time until the end of a red signal is displayed on a display as a waiting time. FIG. 5B is an example in which the remaining time Tr of a red signal is displayed as a waiting time. Moreover, in the case of using the HUD, for example, a lighting time of a signal is displayed by converting it into a width (distance information) of a region to which a lighting color is given. An example of display of the HUD is shown in FIG. 6A. FIG. 6A is a field of view seen by a driver of the vehicle X shown in FIG. 1. As shown in FIG. 6A, in a driver's field of view, a normal field of view and an image projected on a windshield 90 overlap each other and a travel lane divided by lighting colors is seen. A yellow region D2 is a region where the traffic signal 80 becomes yellow lighting while the vehicle X is traveling, and a red region D3 is a region where the traffic signal 80 becomes red lighting while the vehicle X is traveling. The width of a region can be calculated by the vehicle speed obtained by the vehicle speed sensor 21 and the lighting time obtained in the processing of S10. Thus, a timing (boundary of the red region D3) at which red lighting ends can be notified to the driver. After the processing of S18 ends, the process proceeds to timer processing (S20).

The processing of S20 is executed by the driving support unit 13, and is a process of measuring a time (service time k) for which driving support has been executed. For example, assuming that a processing period of the ECU 10 is Te, the driving support unit 13 adds the processing period Te to the last service time k, and the driving support unit 13 sets the result as the service time k. After the processing of S20 ends, the process proceeds to update processing (S22).

The processing of S22 is executed by the driving support unit 13, and is a process of updating the remaining time Tb, Ty, and Ta recorded in a memory in the processing of S10. The driving support unit 13 subtracts the service time k calculated in the processing of S20 from each remaining time. After the processing of S22 ends, the process proceeds to traffic signal passing checking processing (S24).

The processing of S24 is executed by the driving support unit 13, and is a process of determining whether or not vehicle has passed the traffic signal 80 using the navigation system 22. When it is determined that the vehicle X has passed the traffic signal 80, the driving support unit 13 ends the control process shown in FIG. 4. On the other hand, when it is determined that the vehicle X has not passed the traffic signal 80, the process proceeds to the lighting color determination processing again (S14). For this reason, when the vehicle X has not passed the traffic signal 80 yet, display of the time remaining of a signal or display of a color-divided region of the HUD is continuously performed.

On the other hand, when the driving support unit 13 determines that the remaining time Tr of red lighting is equal to or smaller than the threshold value U in the processing of S16, the control process shown in FIG. 4 is ended without notification.

By executing the control process shown in FIG. 4 as described above, a driver is not notified when a time until red lighting changes is equal to or smaller than the threshold value U. When the time until red lighting changes is notified to the driver, the notification is stopped. For example, the remaining time Tr of the red lighting shown in FIG. 5B is not displayed. Alternatively, as shown in FIG. 6B, a region indicating a lighting color of a traffic signal is not displayed. For this reason, it becomes difficult for a driver to accurately predict the end timing of a red signal. Accordingly, it is not possible to perform predictive driving, such as sudden acceleration at a predicted timing, or predictive driving, such as entering an intersection simultaneously with a predicted timing by adjusting the speed.

In addition, such predictive driving of a driver is performed on the basis of prediction that the time at which a red signal ends and the time at which a green signal starts match each other. However, when a traffic signal to be supported is a control type traffic signal, only 1 cycle of green, yellow, and red on the main road is decided, and an arrow lamp may light up after a red signal in the traffic signal 80 of the main road according to the traffic or the like. In this case, since the time at which a red signal ends and the time at which a green signal starts do not necessarily match each other, predictive driving of the driver may not work safely. On the other hand, the predictive driving of a driver can be prevented by executing the control process shown in FIG. 4 to make the end timing of a red signal unclear.

Moreover, when the providing time t1 is the lighting time of a red signal, if the time until the end of a red signal is equal to or smaller than the threshold value U, the control process shown in FIG. 4 can be ended without providing the information to the driver. Accordingly, since it is possible to prevent the notification of the information with little time for determination thereof, it becomes possible to avoid making the driver feel inconvenient.

As described above, according to the driving support apparatus 1 related to the first embodiment, the traffic signal information is acquired and the remaining time Tr until the red lighting changes is calculated. Then, the lighting time information regarding the remaining time Tr can be notified to the driver when the remaining time Tr is larger than the threshold value U, and the lighting time information regarding the remaining time Tr cannot be notified to the driver when the remaining time Tr is equal to or smaller than the threshold value U. In this case, since it is possible to make it difficult to predict the timing, at which red lighting of the traffic signal 80 changes, while red lighting of the traffic signal 80 is changing, it becomes possible to suppress predictive driving according to the timing at which red lighting of the traffic signal 80 changes. Therefore, unsafe actions by the driver based on the traffic signal information received can be suppressed.

(Second Embodiment)

A driving support apparatus 2 related to a second embodiment is configured almost similar to the driving support apparatus 1 related to the first embodiment, and some functions of the driving support unit 13 are different from those in the driving support apparatus 1. Moreover, in the second embodiment, portions repeated in the first embodiment will not be described and an explanation will be focused on the different points.

Figure 7:
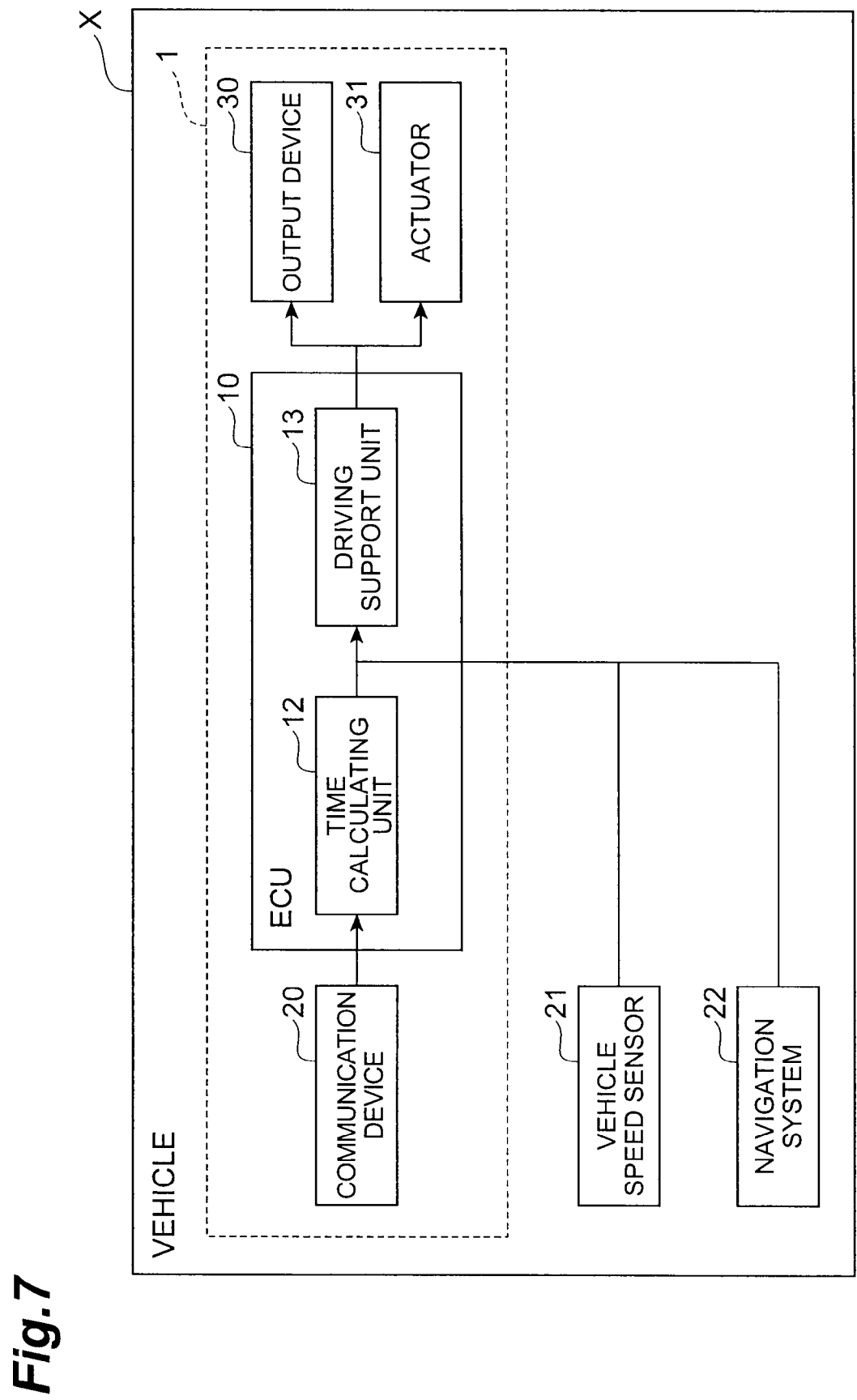
FIG. 7 is a block diagram showing the outline of the configuration of a vehicle including the driving support apparatus related to the second embodiment.

As shown in FIG. 7, the configuration of the vehicle X including the driving support apparatus 2 related to the present embodiment is almost the same as that of the vehicle X including the driving support apparatus 1 related to the first embodiment, and is different in a point that an actuator (vehicle control unit) 31 is provided. An actuator 31 is a mechanical component which controls the traveling of a vehicle and is an electronic throttle, for example. The actuator 31 has a function of invalidating a driver's accelerator operation on the basis of a driving stop command output from the driving support unit 13. In addition, the configuration of a driving support system used in the driving support apparatus 2 is the same as that of the driving support system 4 related to the first embodiment.

The driving support unit 13 provided in the driving support apparatus 2 has the same function as the driving support unit 13 related to the first embodiment. In addition, the driving support unit 13 has a function of notifying a driver of the general lighting time information by controlling the output device (first to third notification units) 30 when the remaining time until a predetermined lighting color changes becomes equal to or smaller than the threshold value U. The general lighting time information is information regarding the time remaining similar to the lighting time information, and a change time of the lighting state is unclearly expressed compared with the lighting time information. For example, when the lighting time information is information indicating the time remaining in seconds as it is, information in which the time remaining is cut and expressed in a large unit equal to or larger than a second unit, for example, in units of 30 seconds, information indicating the time remaining with a bar graph in which a memory unit is 30 seconds, information in which the time remaining cut in units of 30 seconds is expressed after being converted into a distance, information in which the time remaining is expressed after being replaced with words, such as "time enough" and "only a little left", and the like correspond to the general lighting time information. Moreover, for example, when the lighting time information is the information in which the time remaining cut in units of 30 seconds is expressed after being converted into a distance, information in which the time remaining is expressed after being replaced with words and the like correspond to the general lighting time information. Thus, the driving support unit 13 has a function of controlling the output device 30 to stop notification support of the lighting time information and then provide the driver with the information, in which a change time of a lighting state is unclear, so that it is difficult for the driver to predict the timing at which the lighting state of the traffic signal changes compared with the case when the lighting time information is notified.

In addition, the driving support unit 13 has a function of notifying a driver of the guide information, which urges signal watching, by controlling the output device 30 when the remaining time becomes equal to or smaller than the threshold value U. For example, the guide information is information of the content, such as "please look at the signal" and "please check to the front", and is notified by sound or message display.

In addition, the driving support unit 13 has a function of invalidating a driver's accelerator operation by outputting a driving stop signal to the actuator 31 when the remaining time becomes equal to or smaller than the threshold value U.

In addition, the driving support unit 13 has a function of determining in which form the lighting time information, the general lighting time information, and the guide information are to be notified from the output device 30. For example, the driving support unit 13 has a function of determining a notification method, such as performing notification using only sound information, performing notification using sound information and image information, and performing notification using only image information. The driving support unit 13 has a function of outputting to the output device 30 a notification command based on the content of driving support, the notification method, and the like which have been determined. In addition, the driving support unit 13 has a function of outputting a driving stop command to the actuator 31 when outputting the information which invalidates an accelerator operation.

The driving support apparatus 2 is formed by the communication device 20, the time calculating unit 12, the driving support unit 13, the output device 30, and the actuator 31 described above.

Next, an operation of the driving support apparatus 2 related to the present embodiment will be described. The driving support apparatus 2 related to the present embodiment is almost the same as the operation of the driving support apparatus 1 related to the first embodiment, and the operation when it is determined that the remaining time Tr of red lighting is equal to or smaller than the threshold value U in the processing of S16 in FIG. 4 is different. The driving support apparatus 1 related to the first embodiment ends driving support when it is determined that the remaining time Tr of red lighting is equal to or smaller than the threshold value U. On the other hand, the driving support apparatus 2 related to the present embodiment executes another driving support during the remaining time Tr.

For example, the driving support unit 13 and the output device 30 notify the general lighting time information in which the time unit of driving support is set to be larger than the lighting time information of the driving support apparatus 1 related to the first embodiment. For example, in the case of displaying the remaining time Tr of red lighting in seconds as shown in FIG. 5B, the information expressed in words, such as "signal will change soon", is notified. In this case, the end timing of a red signal is unclear but an approximate end timing can be notified to the driver. This can make it difficult for the driver to predict the end timing of a red signal while continuing the driving support.

In addition, as another driving support performed during the remaining time Tr, the driving support unit 13 and the output device 30 notify the information which urges forward visual attention. For example, by notifying the information expressed in words, such as "please look to the front", as shown in FIG. 5C, it is possible to perform a vehicle operation on the basis of an actual traffic signal. Accordingly, it becomes possible to suppress unsafe action by the driver based on prediction.

In addition, as another driving support performed during the remaining time Tr, the driving support unit 13 and the output device 30 perform driving support for invalidating the accelerator operation. For example, the driving support unit 13 makes the actuator 31, which operates according to the driver's accelerator operation, temporarily inoperative. In this case, even if the driver steps on the accelerator for sudden acceleration in accordance with the end timing of a red signal, it is possible to stop the vehicle forcibly. Accordingly, it is possible to reliably prevent unsafe actions by the driver based on prediction.

As described above, according to the driving support apparatus 2 related to the second embodiment, the traffic signal information is acquired and the remaining time Tr until red lighting changes is calculated. Then, the lighting time information can be notified to the driver when the remaining time Tr is larger than the threshold value U, and the lighting time information cannot be notified to the driver when the remaining time Tr is equal to or smaller than the threshold value U. In this case, since it is possible to make it difficult to predict the timing, at which red lighting of the traffic signal 80 changes, while red lighting of the traffic signal 80 is changing, it becomes possible to suppress predictive driving according to the timing at which red lighting of the traffic signal 80 changes. Therefore, unsafe actions by the driver based on the traffic signal information received can be suppressed.

In addition, according to the driving support apparatus 2 of the second embodiment, when the time remaining is equal to or smaller than the threshold value U, the general lighting time information, in which the change time of the lighting state is not clearly expressed compared with the lighting time information, is notified to the driver. Accordingly, since it is possible to make it difficult to predict the timing, at which the lighting state of a traffic signal changes, while continuously providing the information to the driver, it is possible to avoid a situation where the driver feels discomfort due to abrupt stopping of driving support.

In addition, according to the driving support apparatus 2 of the second embodiment, when the time remaining is equal to or smaller than the threshold value U, the guide information which urges signal watching is notified to the driver. Accordingly, since it is possible to perform a vehicle operation on the basis of an actual traffic signal, it becomes possible to suppress unsafe action by the driver based on prediction.

In addition, according to the driving support apparatus 2 of the second embodiment, when the time remaining is equal to or smaller than the threshold value U, the driver's accelerator operation is invalidated. Accordingly, since the accelerator operation can be invalidated even if the driver performs an accelerator operation on the basis of prediction, it becomes possible to reliably prevent an unsafe situation caused by the driver's operation.

(Third Embodiment)

A driving support apparatus related to a third embodiment is configured almost similar to the driving support apparatus 1 related to the first and second embodiments, and some functions of the driving support unit 13 are different from those in the driving support apparatuses 1 and 2. Moreover, in the third embodiment, a portion repeated in the first and second embodiments will not be described and an explanation will be focused on the different points.

The driving support apparatus related to the third embodiment is appropriately used when notifying the signaling information to a driver waiting for a signal, for example.

The configuration of the vehicle X including the driving support apparatus related to the third embodiment is the same as that of the vehicle X including the driving support apparatus 1 related to the first embodiment. In addition, the configuration of a driving support system used in the driving support apparatus is the same as that of the driving support system 4 related to the first embodiment.

The driving support unit 13 provided in the driving support apparatus related to the third embodiment is configured almost similar to the driving support unit 13 related to the first and second embodiments and has a function of notifying a driver of the lighting time information by controlling the output device 30. Here, as the lighting time information, for example, information in which the remaining time Ts until the lighting state of a red signal changes after the vehicle X is stopped by the red signal is updated at predetermined intervals K is used. For example, when the interval K is 1 second, the remaining time Ts counted down in units of 1 second is notified as the lighting time information. When the interval K is 5 second, the remaining time Ts counted down in units of 5 seconds is notified as the lighting time information. When a large unit equal to or more than a second unit is adopted as the interval K, the lighting time information related to the third embodiment corresponds to the general lighting time information related to the second embodiment.

In addition, the driving support unit 13 basically has a function of notifying the driver of the lighting time information until the remaining time Ts becomes equal to or smaller than a predetermined time N and of ending the notification of the lighting time information by controlling the output device 30 when the remaining time Ts becomes equal to or smaller than the predetermined time N.

Here, the driving support unit 13 has a function of setting the end timing of display of the lighting time information to be different from an update timing of the lighting time information when the display of the lighting time information is updated and notified at predetermined intervals K. For example, when the remaining time Ts is updated at intervals of 5 seconds and set as the lighting time information, the driving support unit 13 has a function of setting the update timing of a period of 5 seconds and the end timing of display of the lighting time information to be different from each other.

Moreover, when a time from the start timing of notification of the lighting time information (for example, the timing at which the vehicle X stops for signal waiting) to the end timing of notification of the lighting time information (for example, the timing at which the remaining time Ts becomes the predetermined time N) falls within a predetermined time M, the driving support unit 13 has a function of continuing the notification of the lighting time information even if the remaining time Ts becomes equal to or smaller than the predetermined time N. That is, when the vehicle X has changed to a signal waiting state within the predetermined time M before the set end timing of notification of the lighting time information, the driving support unit 13 has a function of continuing the notification of the lighting time information even if the set end timing of notification of the lighting time information elapses.

Moreover, similar to the driving support unit 13 related to the second embodiment, the driving support unit 13 has a function of notifying the driver of the guide information, which urges signal watching, by controlling the output device 30 when the remaining time Ts becomes equal to or smaller than the predetermined time N. For example, the guide information is information of the content, such as "please look at the signal" and "please check to the front", and is notified by sound or message display. In addition, the driving support unit 13 has a function of changing the end timing of the guide information so that the end timing of the guide information does not synchronize with the signal cycle of the lighting time information.

In addition, the driving support unit 13 has a function of not notifying the driver of the guide information when the remaining time Ts is smaller than the predetermined time L at the start timing of notification of the lighting time information.

In addition, the driving support unit 13 has a function of outputting to the output device 30 a notification command based on the content of driving support, the information method, and the like which have been determined.

Figure 8:
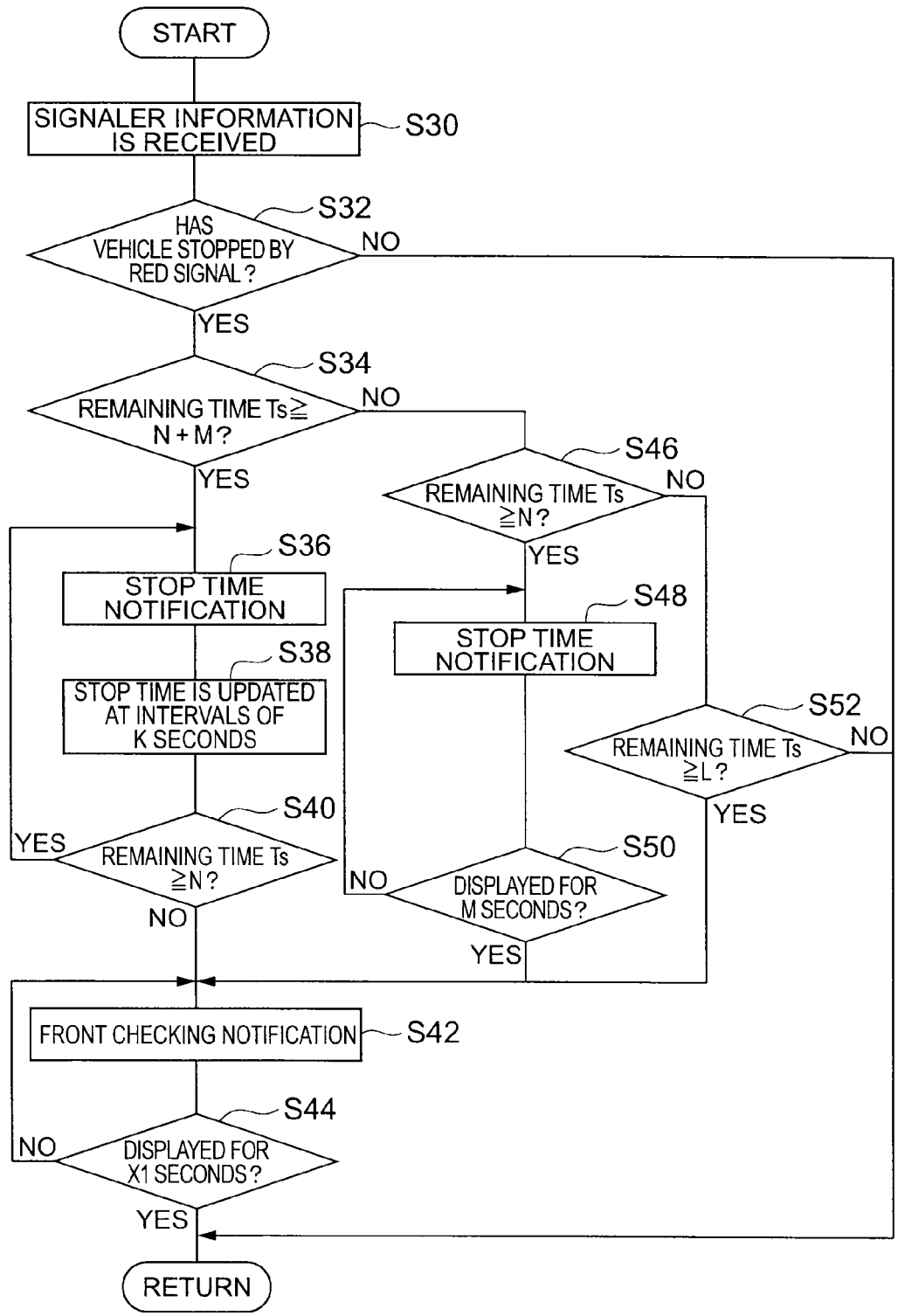
FIG. 8 is a flow chart showing an operation of a driving support apparatus related to a third embodiment.

Next, an operation of the driving support apparatus related to the third embodiment will be described. FIG. 8 is a flow chart showing an operation of the driving support apparatus related to the present embodiment. The control process shown in FIG. 8 is executed at a timing, at which the communication device 20 receives the communication start information from the roadside support apparatus Rn, when the vehicle X travels on the side of the roadside support apparatus Rn, for example. Moreover, the case in which predictive driving according to a red lighting end timing is suppressed will be described below in consideration of the ease of understanding of explanations. In addition, a display is assumed to be used as the output device 30. In addition, the case where the vehicle X travels toward the traffic signal 80 on the main road 70 in FIG. 1 will be described as an example.

The control process shown in FIG. 8 starts from signaling information reception processing (S30). The processing of S30 is processing in which the communication device 20 acquires the traffic signal information of the traffic signal 80 from the roadside support apparatus R1. After the processing of S30 ends, the process proceeds to signal waiting determination processing (S32).

The processing of S32 is executed by the driving support unit 13, and is a process of determining whether or not the vehicle X is in a signal waiting state of a red signal. The driving support unit 13 determines whether or not the vehicle X has stopped at the intersection 60, for example, on the basis of the vehicle speed input from the vehicle speed sensor 21 or the positional information input from the navigation system 22 and its displacement. In addition, the driving support unit 13 determines whether or not the vehicle X has stopped at the red signal on the basis of the traffic signal information of the traffic signal 80 input in the processing of S30. When it is determined that the vehicle X is in a signal waiting state of a red signal in the processing of S32, the process proceeds to remaining time determination processing (S34).

Figure 9:
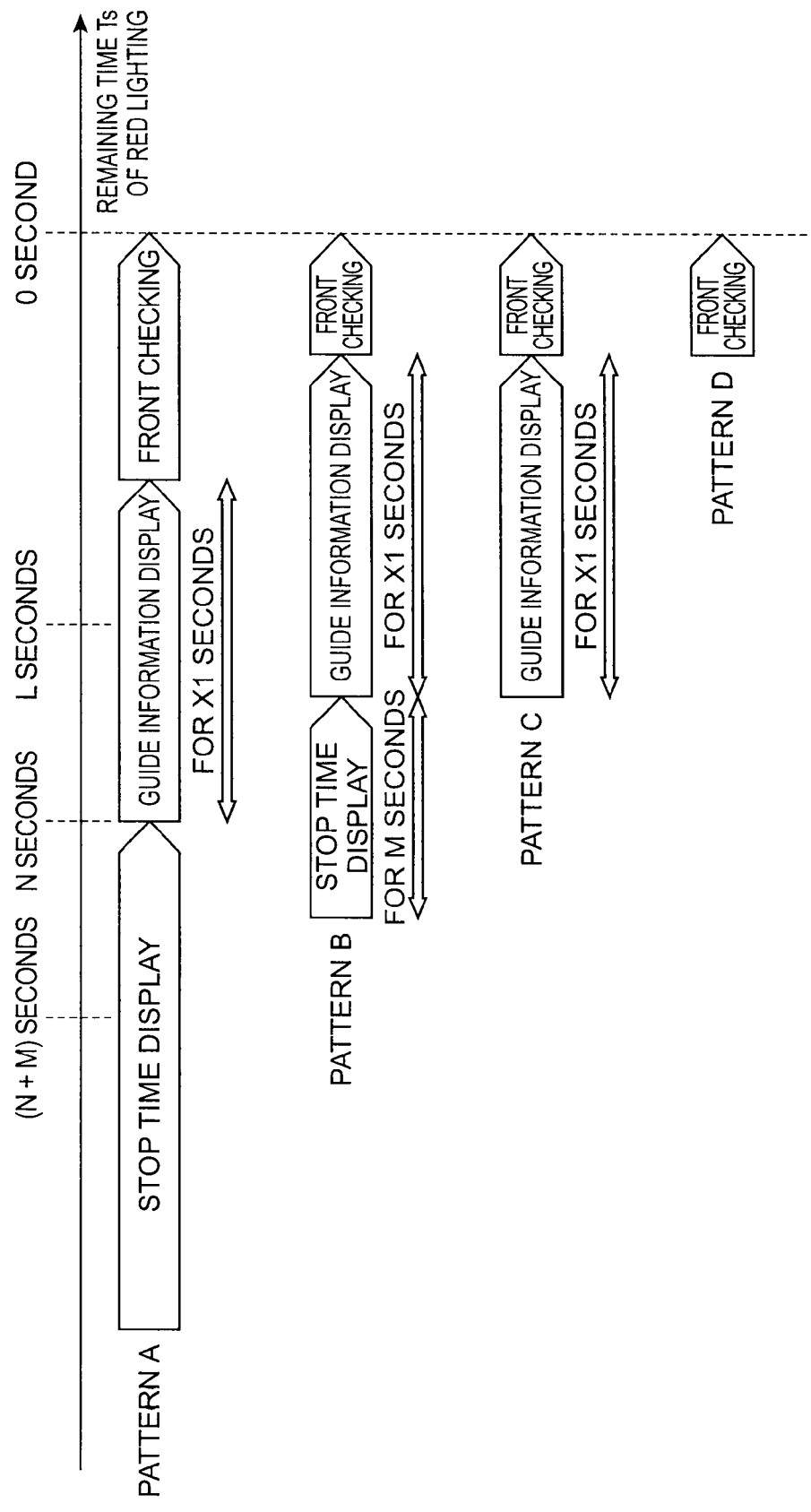
FIG. 9 is a view explaining an operation of the driving support apparatus related to the third embodiment.

The processing of S34 is executed by the time calculating unit 12 and the driving support unit 13, and is a process of calculating and determining the remaining time Ts until the lighting state of a red signal changes after the vehicle X is stopped by the red signal. The time calculating unit 12 calculates the remaining time Ts of the red signal on the basis of the traffic signal information input in the processing of S30. Then, the driving support unit 13 determines whether or not the remaining time Ts of the red signal is equal to or larger than a predetermined time (N+M). Here, the processing content will be described in detail using FIG. 9. FIG. 9 is a schematic view for explaining the operation of the driving support apparatus and is for explaining the relationship between the remaining time Ts of a red signal and the predetermined time N, M, and L. As shown in FIG. 9, the predetermined time N is basically the timing at which notification of the remaining time Ts of a red signal ends, and is a value set with the end of a red signal (remaining time of a red signal is 0) as a reference. The larger the predetermined time N is set, the earlier is the notification of the remaining time Ts of the red signal ended. In addition, the predetermined time M is the duration of screen display of the remaining time Ts, and is a value set with the predetermined time N as a reference. In addition, the predetermined time M is a time set to avoid the situation where the notification of the remaining time Ts of a red signal ends abruptly within a short time. In the processing of S34, when it is determined that the remaining time Ts of a red signal is equal to or larger than the predetermined time (N+M), that is, in the case corresponding to a pattern A of FIG. 9, the process proceeds to stop time notification processing (S36).

The processing of S36 is executed by the driving support unit 13, and is a process of notifying a driver of a signal waiting time (stop time) which is the lighting time information notified to the driver. For example, the driving support unit 13 displays the remaining time Ts of a red signal on the output device 30 as a stop time so that it is notified to the driver. For example, when the remaining time Ts of a red signal is 23 seconds, 23 seconds is notified to the driver as a stop time. Moreover, for example, in the case of executing the stop time notification processing of S36 first, the driving support unit 13 may cut the remaining time Ts of a red signal in a predetermined unit Ks and display the remaining time Ts of the red signal on the output device 30 as a stop time after the cut time elapses so that it is notified to the driver. For example, when the remaining time Ts of a red signal is 23 seconds and the predetermined unit Ks is 5 seconds, the cut time is 3 seconds. Accordingly, after 3 seconds elapses, 20 seconds is notified to the driver as a stop time. After the processing of S36 ends, the process proceeds to stop time update processing (S38).

The processing of S38 is executed by the driving support unit 13, and is a process of updating a stop time. The driving support unit 13 sets the remaining time Ts of a red signal when the interval K has passed from the last stop time as this stop time. That is, the stop time is updated in units of interval K. Here, in the case of notifying the remaining time Ts of a red signal as a stop time as it is in the processing of S36, the driving support unit 13 calculates a time from the stop time notified in the processing of S36 to a timing, at which the remaining time Ts becomes the predetermined time N, and determines whether or not the calculated time is a multiple of the interval K when executing the processing of S38 first. In addition, when the calculated time is a multiple of the interval K, the driving support unit 13 updates the stop time in units of the interval K after a predetermined time (for example, 1 second) elapses so that the stop time does not become a multiple of the interval K. On the other hand, in the case of cutting the remaining time Ts of a red signal in the predetermined unit Ks and setting the result as a stop time in the processing of S36, for example, the predetermined time N is set in advance on the basis of the unit Ks, the interval K, and the predetermined time N so that the update timing is different from a timing of the predetermined time N. Thus, in both the case of setting the remaining time Ts of a red signal as a stop time as it is and the case of cutting the remaining time Ts of a red signal in the predetermined unit Ks and setting the result as a stop time, the driving support unit 13 updates the stop time in units of the interval K at a different timing from the timing at which the remaining time of a red signal becomes the predetermined time N. After the processing of S38 ends, the process proceeds to remaining time determination processing (S40).

The processing of S40 is executed by the time calculating unit 12 and the driving support unit 13, and is a process of determining whether or not the remaining time Ts of a red signal is equal to or larger than the predetermined time N. The time calculating unit 12 calculates the remaining time Ts of a red signal similar to the processing of S34. The driving support unit 13 determines whether or not the calculated remaining time Ts of the red signal is equal to or larger than the predetermined time N. When it is determined that the calculated remaining time Ts of the red signal is equal to or larger than the predetermined time N in the processing of S40, the process proceeds to the stop time notification processing again to notify the driver of the updated stop time (S36), and then the stop time update processing is performed again (S38). Thus, the processing of S36 and S38 is repeatedly executed until the remaining time Ts of a red signal is not equal to or larger than the predetermined time N.

On the other hand, when it is determined that the remaining time Ts of a red signal is not equal to or larger than the predetermined time N in the processing of S40, the process proceeds to front checking notification processing (S42). The processing of S42 is executed by the driving support unit 13, and is a process of notifying the driver of the guide information which urges signal watching. For example, the driving support unit 13 displays on the output device 30 the guide information of the content, such as "please look at the signal" and "please check to the front", so that it is notified to the driver. After the processing of S42 ends, the process proceeds to notification time determination processing (S44).

The processing of S44 is executed by the driving support unit 13, and is a process of determining a notification time of the guide information. For example, the driving support unit 13 determines whether or not a period, for which the guide information is displayed on the output device 30, exceeds a predetermined time X1. For example, on the basis of the traffic signal information input by the processing of S30, the driving support unit 13 sets the predetermined time X1 such that a display end timing of the guide information and the signal cycle of the traffic signal 80 do not synchronize with each other. Then, when it is determined that the period, for which the guide information is displayed on the output device 30, does not exceed the predetermined time X1, the process proceeds to the front checking notification processing again (S42). Thus, the driver is notified of the guide information until it exceeds the predetermined time X1. On the other hand, when it is determined that the period, for which the guide information is displayed on the output device 30, exceeds the predetermined time X1 in the processing of S44, the process shown in FIG. 8 is ended.

In addition, when it is determined that the vehicle X is not in a signal waiting state of a red signal in the processing of S32, the process shown in FIG. 8 is ended because it is not necessary to notify the stop time.

In addition, when it is determined that the remaining time Ts of a red signal is not equal to or larger than the predetermined time (N+M) in the processing of S34, the process proceeds to remaining time determination processing (S46). The processing of S46 is executed by the driving support unit 13, and is a process of determining whether or not the remaining time Ts of a red signal is equal to or larger than the predetermined time N. In the processing of S46, when it is determined that the remaining time Ts of a red signal is equal to or larger than the predetermined time N, that is, in the case corresponding to a pattern B of FIG. 9, the process proceeds to stop time notification processing (S48).

The processing of S48 is executed by the driving support unit 13, and is a process of notifying a driver of a stop time. This processing is the same as the processing of S36. After the processing of S48 ends, the process proceeds to notification time determination processing (S50).

The processing of S50 is executed by the driving support unit 13, and is a process of determining a notification time of a stop time. For example, the driving support unit 13 determines whether or not a period, for which a stop time is displayed on the output device 30, exceeds the predetermined time M. When it is determined that the period, for which the stop time is displayed on the output device 30, does not exceed the predetermined time M in the processing of S50, the process proceeds to the processing of notifying a stop time again (S48). On the other hand, when it is determined that the period, for which the guide information is displayed on the output device 30, exceeds the predetermined time M in the processing of S50, the process proceeds to the front checking notification processing (S42). Thus, even if the vehicle X changes to a signal waiting state immediately before becoming the predetermined time N, the driving support unit 13 notifies a stop time during the predetermined time M.

In addition, when it is determined that the remaining time Ts of a red signal is not equal to or larger than the predetermined time N in the processing of S46, the process proceeds to remaining time determination processing (S52). The processing of S52 is executed by the driving support unit 13, and is a process of determining whether or not the remaining time Ts is equal to or larger than the predetermined time L. As shown in FIG. 9, the predetermined time L is a time for which display of the output device 30 is not possible, and is a value set with the end of a red signal (remaining time of a red signal is 0) as a reference. The predetermined time L is a time which is set in advance so that the lighting time information and the like are not displayed on a screen when the state has changed to a signal waiting state immediately before the lighting state of a red signal changes. In the processing of S52, when it is determined that the remaining time Ts is equal to or larger than the predetermined time L, that is, in the case corresponding to a pattern C of FIG. 9, the process proceeds to the front checking notification processing because there is enough time until the remaining time Ts of a red signal becomes 0 (S42). On the other hand, in the processing of S52, when it is determined that the remaining time Ts is not equal to or larger than the predetermined time L, that is, in the case corresponding to a pattern D of FIG. 9, the control process shown in FIG. 8 is ended without displaying anything on the screen because there is not enough time until the remaining time Ts of a red signal becomes 0. Thus, since it is possible to prevent the notification of the information with little time for determination thereof, it becomes possible to avoid making the driver feels inconvenienced.

As described above, the control process shown in FIG. 8 is ended. By executing the control process shown in FIG. 8, a display screen of the lighting time information can be ended at a different timing from the update timing of the lighting time information. Accordingly, unsafe action by the driver based on the traffic signal information received can be suppressed while reducing a sense of unease of the driver.

For example, when the display screen of the lighting time information ends at the same timing as the update timing of the lighting time information, the driver may misunderstand that there is the remaining time Ts longer than the original remaining time Ts. As a specific example, the case will be described in which the vehicle X stops when the remaining time Ts is 20 seconds. Here, the update interval K is set to 5 seconds and the timing at which display of a stop time ends is set to 5 seconds before the end of a red signal (that is, N=5 seconds). In this case, the stop time is updated and notified at intervals of 5 seconds. That is, the stop time is updated to 20 seconds, 15 seconds, and 10 seconds and notified to the driver. However, even if the stop time is updated when the remaining time Ts is 5 seconds, the stop time is not notified. Accordingly, at the point of time when the remaining time Ts is 5 seconds, display of the stop time is ended in a state where "stop time is 10 seconds left" is displayed. For this reason, although the actual remaining time Ts is 5 seconds, the driver may feel that the remaining time Ts is 10 seconds. That is, a difference occurs between the content of support and a driver's impression.

On the other hand, for example, the timing at which display of a stop time ends may be set to 7 seconds before the end of a red signal (that is, N=7 seconds) instead of 5 seconds equal to the update interval K. In this case, the stop time is updated to 20 seconds, 15 seconds, and 10 seconds and notified to the driver. Then, after "stop time is 10 seconds left" is displayed, the display of a stop time can be ended at the remaining time of 7 seconds after 3 seconds elapses. For this reason, since the difference between the time that the driver feels due to notification of a stop time and the actual remaining time Ts can be reduced, it is possible to reduce a sense of unease of the driver.

In addition, by executing the control process shown in FIG. 8, the lighting time information can be continuously displayed to some extent without a display screen being changed in a short time. Accordingly, the information which is easy to recognize can be provided.

For example, in the case where the update interval K and the display end (or display change) timing of a stop time are shifted from each other, the stop time disappears immediately after being displayed on the screen once or is changed to display of the guide information immediately after being displayed once when starting the notification of the stop time immediately before the display end timing. Accordingly, the driver may not be able to recognize the information. For example, in the case where the display end timing of a stop time is set to 7 seconds before the end of a red signal, the display of the stop time ends after notifying the stop time only for 1 second when the notification starts from the remaining time Ts of 8 seconds. Accordingly, it is difficult for the driver to recognize the information.

On the other hand, when the vehicle X stops between the update interval K and the display end timing N of a stop time, the display duration M for which display continues is set even if the display end timing N of the stop time elapses. Accordingly, it is possible to avoid frequent screen changes. For this reason, since it is possible to prevent notification of the information with little time for determination thereof, it becomes possible to avoid making the driver feel inconvenienced.

As described above, according to the driving support apparatus of the third embodiment, it is possible to reduce a difference between the content of support and the driver's feeling. Accordingly, unsafe action by the driver based on the traffic signal information received can be suppressed while reducing a sense of unease of the driver. In addition, since a screen change within a short time can be avoided, it becomes possible to perform driving support which is easy for the driver to understand. Moreover, in the case of ending the notification of the information regarding a signal, it is possible to prevent a driver from guessing or learning a signal cycle on the basis of the end of a screen by setting it so as not to synchronize with the signal cycle.

Moreover, it is preferable that the first notification unit continues the notification of the lighting time information when a time from the start timing of notification of the lighting time information to the end timing of notification of the lighting time information falls within a predetermined time. By adopting such a configuration, a screen change within a short time can be avoided. Accordingly, it becomes possible to perform driving support which is easy for the driver to understand.

In addition, each embodiment described above shows an example of the driving support apparatus related to the present invention. The driving support apparatus related to the present invention is not limited to the driving support apparatus related to each embodiment, and the driving support apparatus related to each embodiment may be modified or applied to other things without departing from the scope of the present invention as defined in the appended claims.

For example, although the case in which notification is performed by the HUD when the notification is performed in seconds has been described in each embodiment described above, the display form is not limited to this and display in a bar graph or notification using only sound is also possible.

In addition, although the example where the end timing of a red signal is made unclear under predetermined conditions has been described in each embodiment described above, it is not limited to the red signal and the end timing of a green signal or a yellow signal may also be made unclear. In particular, by unclearly notifying the green signal end timing, it is possible to ease the impatience of a driver who thinks it might be late for the end of a green signal in this state and also to prevent entering an intersection by sudden acceleration to meet the end of a green light. Therefore, it becomes possible to prevent an unsafe situation caused by the driver's operation based on the traffic signal information.

In addition, although the example where the information used for driving support is acquired by road to vehicle communication has been described in each embodiment described above, the communication means is not limited to the road-to-vehicle communication and vehicle to vehicle communication or the like is also possible.

In addition, although the example where support for notifying the general lighting time information, support for notifying the information which urges forward visual attention, and support for invalidating the accelerator operation are performed as another driving support performed during the remaining time Tr has been described in the second embodiment described above, some of these driving supports or the combination may also be executed.

In addition, although the example where the driving support apparatus includes the time calculating unit 12 has been described in each embodiment described above, the time calculating unit 12 may be provided when necessary. For example, the time calculating unit 12 may not be provided in the case of receiving the time remaining until the lighting state changes from the roadside support apparatus Rn or another vehicle.

The invention claimed is:

1. A driving support system which performs driving support regarding a traffic signal, comprising:
    a receiver configured to receive time-series traffic signal information regarding a lighting state of the traffic signal; and
    a display configured to notify a driver of lighting time information regarding a time remaining until the lighting state changes,
    wherein the display does not perform notification of the lighting time information when the time remaining is equal to or smaller than a predetermined value, and
    wherein the predetermined value is greater than 1 second.

2. The driving support system according to claim 1, wherein the display is configured to notify the driver of an end of notification of the lighting time information which is different from an update of the lighting time information in terms of time when notifying of the lighting time information at predetermined intervals.

3. The driving support system according to claim 2, wherein the display continues notification of the lighting time information when a time from a start of notification of the lighting time information to the end of notification of the lighting time information is equal to or smaller than a predetermined time, even if the time remaining is equal to or smaller than the predetermined value.

4. The driving support system according to claim 1, wherein the lighting state of the traffic signal is a red light.

5. A driving support system which performs driving support regarding a traffic signal, comprising:
    a receiver configured to receive time-series traffic signal information regarding a lighting state of the traffic signal;
    a calculation unit which calculates a time remaining until the lighting state changes on the basis of the traffic signal information; and
    a display configured to notify a driver of lighting time information regarding the remaining time,
    wherein the display does not perform notification of the lighting time information when the time remaining is equal to or smaller than a predetermined value, and
    wherein the predetermined value is greater than 1 second.

6. The driving support system according to claim 5, wherein the display is further configured to notify the driver of general lighting time information, in which a change time of the lighting state is approximately expressed by translating the lighting time information, when the time remaining is equal to or smaller than a predetermined value.

7. The driving support system according to claim 5, wherein the display is further configured to notify the driver of guide information, which urges signal watching, when the time remaining is equal to or smaller than a predetermined value.

8. The driving support system according to claim 5, further comprising:
    a vehicle control unit which invalidates an accelerator operation from the driver when the time remaining is equal to or smaller than a predetermined value.

9. The driving support system according to claim 5, wherein the display is configured to notify the driver of an end of notification of the lighting time information which is different from an update of the lighting time information in terms of time when notifying of the lighting time information at predetermined intervals.

10. The driving support system according to claim 9, wherein the display continues notification of the lighting time information when a time from a start of notification of the lighting time information to the end of notification of the lighting time information is equal to or smaller than a predetermined time, even if the time remaining is equal to or smaller than the predetermined value.

11. The driving support system according to claim 5, wherein the lighting state of the traffic signal is a red light.

12. A driving support system which performs driving support regarding a traffic signal, comprising:
    a receiver configured to receive time-series traffic signal information regarding a lighting state of the traffic signal from a roadside support apparatus;
    an output device which provides lighting time information regarding the lighting state of the traffic signal; and
    an electronic control unit including control logic programmed to
        calculate a time remaining until the lighting state of the traffic signal changes based on the received time-series traffic signal information; and
        determine if the time remaining until the current lighting state of the traffic signal changes is greater than a predetermined value,
    wherein the output device provides the lighting time information if the lighting state is a red light and the time remaining until the current lighting state of the traffic signal changes is greater than the predetermined value, wherein the output device does not provide the lighting time information if the lighting state is the red light and the time remaining until the current lighting state of the traffic signal changes is less than or equal to the predetermined value, and wherein the predetermined value is greater than 1 second.

13. The driving support system according to claim 12, wherein the output device is provided inside a vehicle.

* * * * *